Patented Dec. 27, 1927.

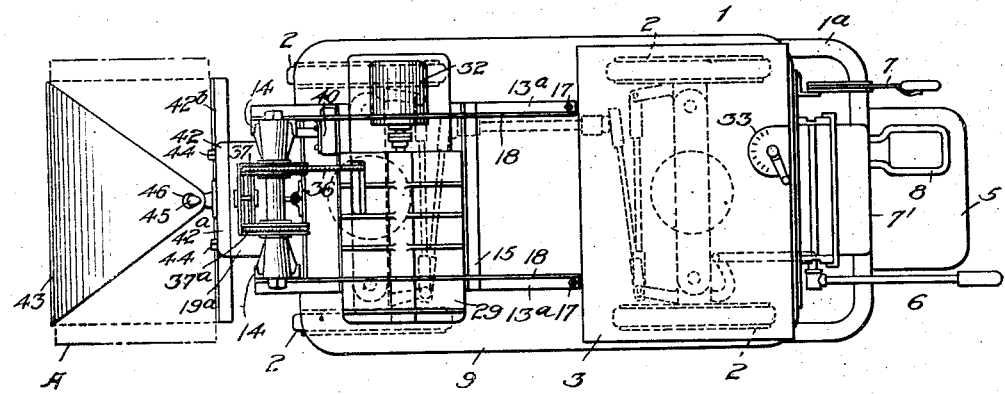
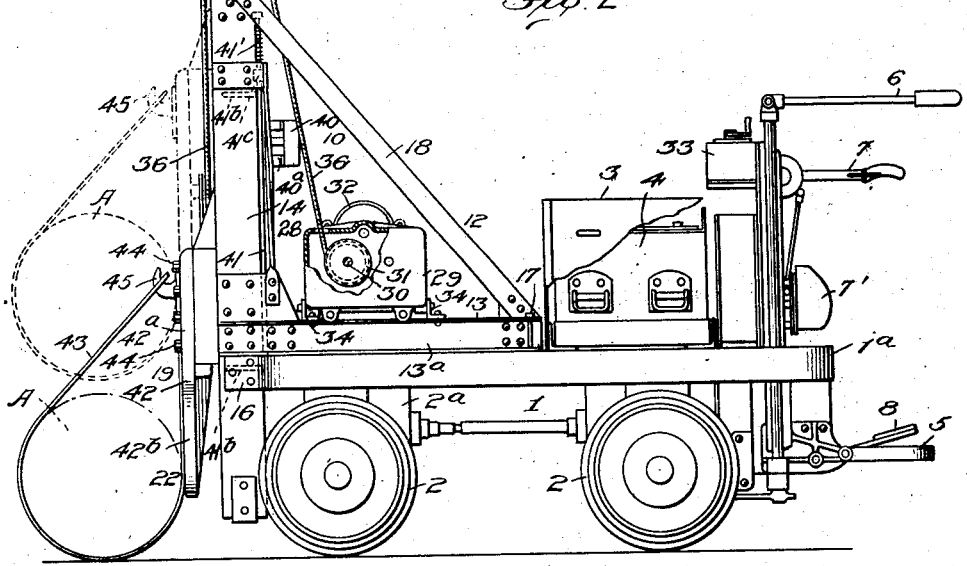

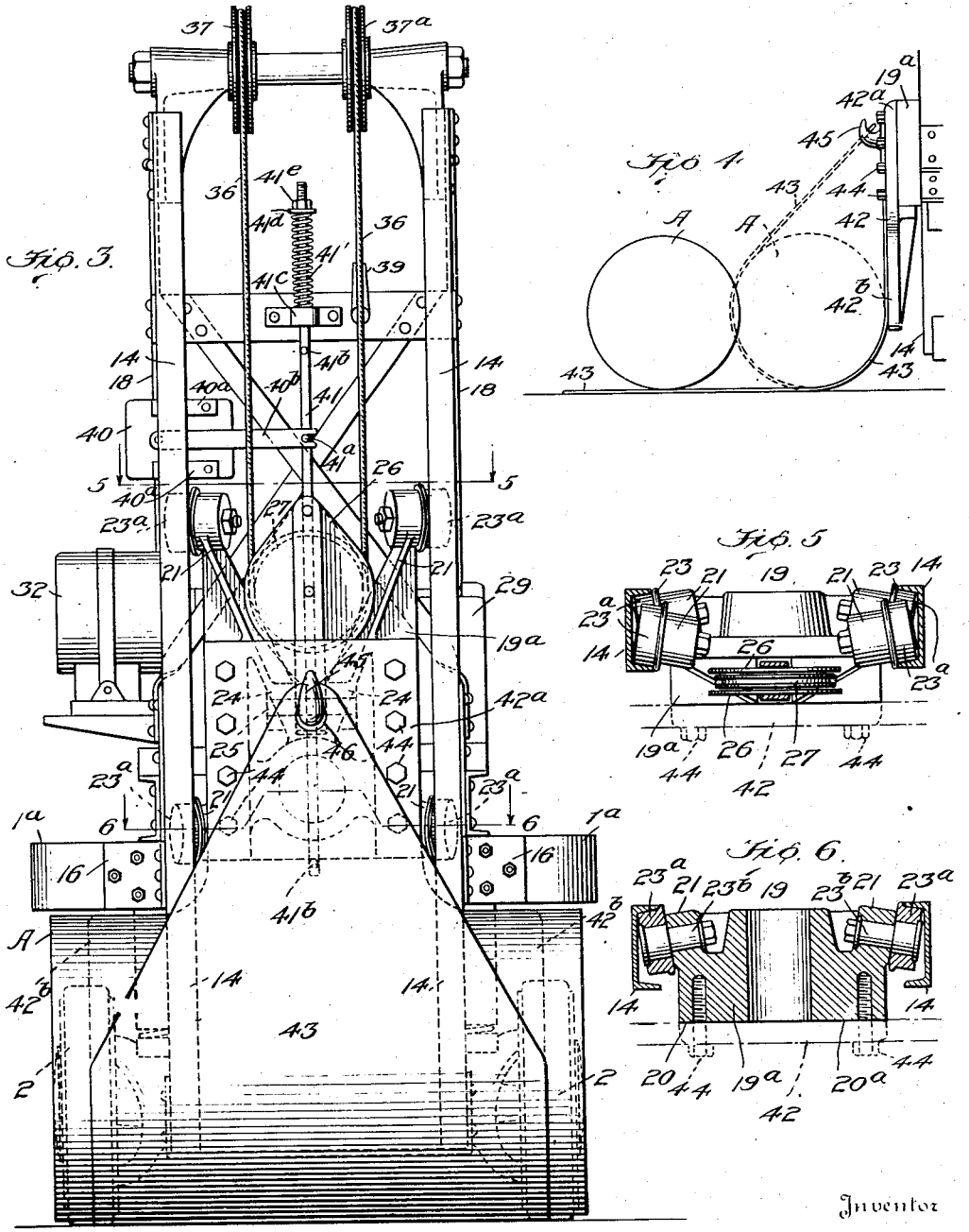

1,654,470

UNITED STATES PATENT OFFICE.

EDWARD H. REMDE, OF CLEVELAND, OHIO, ASSIGNOR TO THE BAKER-RAULANG COMPANY, OF CLEVELAND, OHIO, A CORPORATION OF OHIO.

INDUSTRIAL TRUCK.

Original application filed March 11, 1921, Serial No. 451,622. Divided and this application filed February 3, 1923. Serial No. 616,694.

This invention relates to a truck for industrial uses, more particularly to a truck having mounted on it an elevating and carrying mechanism, whereby goods can be transported from place to place rapidly and economically.

One object of the invention is to provide a truck having an improved elevating and carrying mechanism so constructed that bodies may be readily positioned in the elevating and carrying mechanism, elevated and transported, and stored.

Another object of the invention is to mount on the frame of a truck an elevating mechanism of relatively simple construction, whereby the same may be readily operated.

Other objects of the invention will be apparent to those skilled in the art to which my invention relates from the following description taken in connection with the accompanying drawings.

For the purpose of illustration, I have, in the accompanying drawings shown and herein described one form of apparatus embodying my invention.

Fig. 1 is a top plan view of a truck embodying my invention.

Fig. 2 is a side elevation of the truck.

Fig. 3 is an end elevation looking toward the right in Figs. 1 and 2, enlarged.

Fig. 4 is a fragmentary view illustrating the method of loading a body.

Fig. 5 is a section on the line 5—5 of Fig. 3.

Fig. 6 is a section on the line 6—6 of Fig. 3.

In the drawings, 1 indicates as an entirety the truck or motor vehicle, preferably of the electric motor driven type, and having a frame 1ª and wheels 2, certain or all of which, if desired, may be driven by a driving mechanism 2ª and steered. 3 indicates a housing within which suitable storage batteries 4 may be arranged. In Figs. 1 and 2 I have shown at one end of the truck a platform 5 on which the operative may stand, and control elements 6, 7 and 8 in convenient positions for manipulation in a well-known way, the control element 7 serving to operate a suitable controller 7' to control the motor of the driving mechanism 2ª. 9 indicates a platform secured in any desired manner to the frame 1ª.

10 indicates as an entirety the lifting and carrying mechanism rigidly mounted on the frame 1ª and platform 9 of the truck 1. Of the lifting and carrying mechanism, 12 indicates a frame preferably comprising a base 13 fixed to the frame 1ª and platform 9 and a pair of spaced guide members 14 preferably extending vertically above and below the base 13. The guide members 14 preferably consist of channel bars the flanges of which serve as front and rear guide walls for an elevating member 19 to be later referred to.

The base 13 preferably comprises a pair of channel bars 13ª, which may be connected together by cross members, one thereof being indicated at 15. The frame 12 is secured to the truck by a pair of angle plates 16, which are bolted and riveted to the truck frame 1ª and guide members 14, respectively, and by bolts 17 extending through the channel bars 13 near their inner ends to secure the latter to the platform 9. The upper ends of the guides 14 may be braced by a pair of tie-rods 18 rigidly secured in any well-known manner to the inner ends of the bars 13ª.

The elevating member 19 comprises a casting having a body portion 19ª provided with seats 20, 20ª, and pairs of upper and lower arms 21. The body portion 19ª is adapted to have connected to it a lifting and carrying element 22 which will be later described. 23 indicates devices carried by the arms 21 and arranged to engage the flanges of the guide members 14. The devices 23 preferably comprise flanged rollers 23ª mounted on stud-shafts 23ᵇ the stems of which fit into openings formed in the arms 21. The arms 21 of each pair are preferably offset, relative to the central longitudinal plane of the guide members, whereby the upper devices 23 will engage the front flanges of the guide members 14 and the lower devices 23 will engage the rear flanges thereof. 24 indicates a pair of spaced lugs between which extends a pin or shaft 25. 26 indicates a frame swiveled on the pin or shaft 25 and supporting between its bifurcated members a pulley 27 the purpose of which will be later set forth.

28 indicates as an entirety mechanism for raising and lowering the elevating member 19. Of this mechanism, 29 indicates a frame preferably in the form of a casing. The opposite end walls of the casing are provided with openings to receive and support the opposite ends of a shaft 30 carrying a drum 31. 32 indicates an electric motor preferably mounted on a bracket or other extension member of the frame 29. The shaft of the motor 32 is connected through suitable gearing (not shown) with the drum shaft, whereby the latter may be driven in either direction at will. 33 indicates a suitable controller, for operating the motor 32. The controller is placed within convenient reach of the operative. 34 indicates a plurality of devices serving to rigidly clamp the casing 29 to the bars 13$^a$, at all times. 36 indicates the hoisting rope, which is adapted to be wound on and unwound from the drum 31. The rope is connected to the drum in any suitable manner. From it, the rope 36 extends upwardly around a sheave 37 loosely mounted on a shaft 38 supported by the upper ends of the guide members 14. The rope then extends downwardly around the pulley 27 and then upwardly and over a second sheave 37$^a$ on the shaft 38, its opposite end being anchored in any desired manner, for example by a clamp 39.

40 indicates a casing having pairs of suitable contact devices (one device of each pair being movable), through which electric current is established to operate the motor 32 when the lifting member is raised and lowered. 40$^b$ indicates an arm pivoted to the casing 40 and arranged to engage and operate the movable device of either pair of said contact devices to break the electric circuit when the arm is swung in one direction or the other. At its outer end the arm 40$^b$ is bifurcated and straddles a pin or projection 41$^a$ carried by a movable member 41. The member 41 preferably comprises a bar and carries a pair of spaced tappets 41$^b$, 41$^b$, which project into the path of movement of the elevating member 19 or some element carried thereby. The bar 41 is slidably mounted by suitable guide devices 41$^c$ (one being shown in Fig. 3), whereby it can move endwise in either direction. The normal position of the bar 41 is shown in Fig. 3, being held against movement downwardly by a coiled spring 41' interposed between the guide device 41$^c$ and a collar or washer 41$^d$ adjustably mounted on the upper end of the rod by a nut 41$^e$. Upon engagement of the member 19 with one of the tappets 41$^b$, the bar 41 is moved endwise and it in turn, through the pin 41$^a$, swings the arm 40$^b$, causing the latter to break the circuit. This operation shuts off the motor and arrests the elevating member 19 against further movement. If the bar 41 has been moved upwardly, it will move downwardly by gravity when the elevating member 19 is operated downwardly, until the spring 41' engages the guide device 41$^c$; if the bar 41 has been moved downwardly, such movement will compress the spring 41' which will return the bar to normal position when the elevating member 19 moves upwardly.

The lifting and carrying element 22 is particularly adapted for engaging and lifting relatively large or heavy articles that are round or substantially of curvilinear shape, such as rolls of paper, indicated at A in the drawings, rolls of cloth, cylinders and pipes, whereby they can be packed, piled or transported from one place to another. For carrying out these and other incidental operations, the lifting element 22 comprises a base 42 and a web 43. The base 42 comprises a plate having a main section 42$^a$ and a depending section 42$^b$. The main section 42$^a$ is arranged to be secured to the seats 20, 20$^a$, in any desired manner, for example, by a plurality of bolts 44, the inner ends of which engage threaded openings formed in the body portion 19$^a$ (see Fig. 6) of the elevating member 19. The openings for the bolts 44 in the base plate 42 are preferably uniformly spaced so that the bolts can be removed and the plate adjusted up or down on the body portion 19$^a$. The depending section 42$^b$ extends downwardly below the elevating member 19 so that it can serve as an abutment for the roll or other articles to be lifted or transported. The web 43 comprises a relatively wide strip of flat flexible material, such as leather, canvas or other suitable material having sufficient strength to support the maximum load which it may be necessary to lift at any time. The web 43 is connected at its inner end in any desired manner to the base 42, but preferably along a horizontal line so that it is flexible or foldable in a vertical plane; this arrangement permitting the web to be positioned on the floor in the manner to be later set forth. As shown, the web 43 extends laterally beyond the opposite edges of the abutment 42$^b$, this arrangement enabling the web to lift and carry the paper roll or other body without danger of its sagging at one end and causing undue strains on the web or other parts of the mechanism. The web is of a length to extend around the article or body to be lifted and be connected, in a detachable manner, at its free end to a suitable connecting device, such as a hook 45, carried by the plate 42.

In using the lifting and carrying element 22, the elevating member 19 is lowered to the position shown in Fig. 2, and the free or unattached portion of the web 43 is allowed to lie flat on the floor or surface, as shown in Fig. 4. The roll or cylinder or other body is then rolled over onto the web and against the abutment 42$^b$, thereafter the free end of the web, which is formed with an opening 46, is brought up and hooked over the hook 45, attached to the base plate 42. The hoisting or elevating mechanism may then be operated to raise the elevating member 19 to the position shown in dotted lines in Fig. 2. As shown in Fig. 3, the hook 45 and opening 46 are arranged substantially midway between the opposite side edges of the web 43, so that when the elevating member 19 is operated in either direction the body to be raised or lowered will be maintained or supported in a substantially horizontal position. To release the free end of the web 43, the elevating member is lowered so that the body rests on the floor or other support. This operation will release the tension on the web and thus allow it to be detached from the hook 45.

From the foregoing description it will be seen that I provide a mechanism for lifting or transporting bodies that is of relatively simple construction. Since the body engaging member is flexible and may be laid flat on the floor, the body or article to be lifted may be readily moved over or upon the flexible member (where the body is round it may be rolled into engaging position) and connected in carrying position to the raising and lowering element 22 in a simple manner with minimum labor and then readily lifted or transported.

To those skilled in the art of making mechanism of the class described, many alterations in construction and widely differing embodiments and applications of my invention will suggest themselves, without departing from the spirit and scope thereof. My disclosures and the description herein are purely illustrative and are not intended to be in any sense limiting.

This application is a division of my original application filed March 11, 1921, Serial No. 451,622.

What I claim is:

1. In apparatus of the class described, the combination of a truck frame, a guide frame mounted thereon, an elevating member slidably mounted in said guide frame, means for vertically moving said elevating member, said means including a flexible member connected to said elevating member, a body engaging member, adapted to be flexed on transverse lines, connected at one end to said elevating member and arranged to be folded or wrapped around a body to be raised or lowered, and means for detachably connecting the opposite end of said body engaging member to said elevating member independently of the connection of said flexible member thereto to support the body on said member independently of said vertically moving means, whereby the operation of the latter does not affect the engagement of said body engaging member with the body.

2. In a vehicle construction, the combination with a frame having supporting wheels, and means for steering certain of said wheels, of a guide on said frame, a raising and lowering mechanism including an element slidably engaging said guide, and a web having a width greater than said element and extending laterally beyond its side edges and connecting at its opposite ends thereto, one end of said web being detachably connected to said element and the other end being connected horizontally thereto, whereby the web may be positioned on the ground or floor and the body to be lifted rolled over onto the web.

3. In apparatus of the class described, the combination of a wheel mounted frame, a guide on said frame, an elevating member slidably engaging said guide, a flexible member connected at one end to the lower portion of said elevating member and arranged to be wrapped around a body to be lifted, means for detachably connecting the opposite end of said flexible member to said elevating member, whereby the body is mounted thereon, and means operable without affecting the mounting of the body on said elevating member for raising and lowering the latter.

4. A vehicle construction as claimed in claim 3, in which the elevating member includes a vertically adjustable section to which said body supporting member is connected.

5. In a vehicle construction, the combination of a frame having supporting wheels, a guide on said frame, an element slidably engaging said guide, a relatively wide member having its inner end arranged horizontally and connected to said element and adapted to engage a body to be lifted or transported, means for connecting the free end of said member at a point midway between its side edges to said slidable element, whereby the body to be engaged is supported thereon, said connecting means comprising a hook carried by the slidable element and disposed in a vertical plane midway between the side edges of said body engaging member and an opening formed in the latter to receive said hook, and means for moving said element along said guide.

In witness whereof I have hereunto subscribed my name.

EDWARD H. REMDE.